United States Patent
Broder (10) Patent No.: US 10,767,903 B2
(45) Date of Patent: Sep. 8, 2020

(54) COAXIAL GROUND HEAT EXCHANGER AND METHOD FOR INSTALLING SAID GROUND HEAT EXCHANGER IN THE GROUND

(71) Applicant: BRODER AG, Sargans (CH)

(72) Inventor: Mathias Broder, Sargans (CH)

(73) Assignee: BRODER AG, Sargans (CH)

(*) Notice: Subject to any disclaimer, the term of this patent is extended or adjusted under 35 U.S.C. 154(b) by 250 days.

(21) Appl. No.: 14/541,666

(22) Filed: Nov. 14, 2014

(65) Prior Publication Data

US 2015/0068740 A1 Mar. 12, 2015

Related U.S. Application Data

(63) Continuation of application No. PCT/CH2013/000055, filed on Mar. 27, 2013.

(30) Foreign Application Priority Data

May 14, 2012 (CH) .......................... 681/12

(51) Int. Cl.
*F24T 10/17* (2018.01)
*F24T 10/10* (2018.01)
(Continued)

(52) U.S. Cl.
CPC ............ *F24T 10/10* (2018.05); *E21B 3/00* (2013.01); *E21B 36/00* (2013.01); *F24T 10/17* (2018.05);
(Continued)

(58) Field of Classification Search
CPC ... F24J 3/083; F24J 3/084; F24J 3/081; E21B 36/00; Y02E 10/12; Y02E 10/125; F28D 7/12
See application file for complete search history.

(56) References Cited

U.S. PATENT DOCUMENTS 5,339,890 A * 8/1994 Rawlings ............. F24J 3/084
165/142
5,985,483 A * 11/1999 Verhoog ............. H01M 2/1077
429/120
(Continued)

FOREIGN PATENT DOCUMENTS

DE 4329269 A1 * 4/1994 ........... E21B 33/127
DE 202004007567 U1 9/2004
(Continued)

OTHER PUBLICATIONS

International Search Report (PCT/ISA/210) mailed on *, by the * Patent Office as the International Searching Authority for International Application No. PCT/CH2013/000055, Nov. 4, 2014.

*Primary Examiner* — Frantz F Jules
*Assistant Examiner* — Lionel Nouketcha
(74) *Attorney, Agent, or Firm* — Buchanan Ingersoll & Rooney PC (57) ABSTRACT

A coaxial ground heat exchanger and installation method are disclosed where the heat exchanger has a central core tube that can be provided with a thermally insulating casing and an outer tube that delimits an annular gap which extends radially outwards from the core tube. The core tube and the annular gap can be configured such that a flowable heat transfer medium can flow through. The outer tube is formed by a tubular expandable cover that directly adjoins a wall of a ground heat exchanger borehole when the heat exchanger is installed.

5 Claims, 3 Drawing Sheets

(51) Int. Cl.
    *E21B 3/00*     (2006.01)
    *E21B 36/00*    (2006.01)
    *F24T 10/00*    (2018.01)
    *F28D 7/12*     (2006.01)

(52) U.S. Cl.
    CPC .......... *F24T 2010/53* (2018.05); *F28D 7/12* (2013.01); *Y02E 10/12* (2013.01); *Y02E 10/125* (2013.01)

(56) References Cited

U.S. PATENT DOCUMENTS

| | | | |
|---|---|---|---|
| 2010/0200192 A1 | 8/2010 | Consigny | |
| 2011/0209848 A1* | 9/2011 | Wiggs | F24J 3/081 165/45 |
| 2011/0265989 A1* | 11/2011 | Alexandersson | E21B 33/138 166/208 |
| 2012/0018120 A1* | 1/2012 | Danko | F24J 3/085 165/45 |
| 2012/0175077 A1 | 7/2012 | Lehmann et al. | |

FOREIGN PATENT DOCUMENTS

| | | | |
|---|---|---|---|
| FR | 2918086 A1 | 1/2009 | |
| KR | 101061494 B1 * | 9/2011 | |
| WO | WO 00/36343 A1 | 6/2000 | |
| WO | WO 0036343 A1 * | 6/2000 | F24J 3/081 |
| WO | WO 0037862 A1 * | 6/2000 | F24J 3/081 |
| WO | WO 2011/126359 A2 | 10/2011 | |

* cited by examiner

PRIOR ART

COAXIAL GROUND HEAT EXCHANGER AND METHOD FOR INSTALLING SAID GROUND HEAT EXCHANGER IN THE GROUND

RELATED APPLICATIONS

This application claims priority as a continuation application under 35 U.S.C. § 120 to PCT/CH2013/000055, which was filed as an International Application on Mar. 27, 2013 designating the U.S., and which claims priority to Swiss Application 681/12 filed in Switzerland on May 14, 2012. The entire contents of these applications are hereby incorporated by reference in their entireties.

FIELD

The present disclosure relates to a coaxial ground heat exchanger. In addition, the present disclosure also relates to a method for mounting underground a coaxial ground heat exchanger.

BACKGROUND INFORMATION

The foreseeable scarcity of fossil energy sources and the necessity to reduce the emissions of air pollutants and $CO_2$ have led to a rethinking in the production of heat and the use of alternative, renewable energy, such as pollutant-free technologies, to ensure greater acceptance. An especially attractive form of heat production is the use of downhole heat. Downhole heat or geothermal energy is the energy below the earth's surface that is stored in the form of heat.

Even approximately 10 to 20 m below the earth's surface, the soil has an approximately constant temperature over the entire year, which increases with increasing depth. The natural temperature gradient of the soil is approximately 0.03 K/m of depth. This temperature is determined by the heat flux from the interior of the earth. The recovery of heat can be carried out by ground heat exchangers, which are embedded in a vertical, tight backfilled hole of, for example, 50 to 350 m of depth. A ground heat exchanger takes on the task of transferring sensitive heat energy present in the soil to a heat transfer medium that circulates in the exchanger, which medium transports the heat energy from the soil to the surface. There, the heat energy can be transferred to a second heat transfer medium that circulates in a heat pump.

In many cases, known ground heat exchangers are designed as U-tube exchangers, in which the heat transfer medium flows in a tube branch from the surface to the base of the ground heat exchanger hole; i.e., from top to bottom. In the other tube branch, the circulating heated heat transfer medium flows from the borehole base to the surface; i.e., from bottom to top. When rising, the heat transfer medium always releases a portion of the accumulated heat energy to the heat transfer medium circulating downward in the adjacent tube branch and to the surrounding colder soil. As a result of this undesirable release of heat, the exergetic efficiency of U-tube exchangers is relatively modest.

To improve efficiency, coaxial ground heat exchangers have been used. In the case of coaxial ground heat exchangers in the outer annular gap, the heat transfer medium flows from the surface to the borehole base, whereby it takes up sensitive heat energy that is present in the soil and flows back again through a central core tube upward onto the surface. If the central core tube is thermally insulated in such coaxial ground heat exchangers, the exergetic efficiency can be significantly increased relative to the U-tube exchangers.

While deep-reaching coaxial ground heat exchangers with insulated core tubes relative to the other known types of ground heat exchangers have a major exergetic advantage relative to the quality of the applicable heat flux, they also have the drawback of a large pressure drop of the heat transfer medium. That is, a large portion of the available cross-section of the ground heat exchanger hole is lost owing to the cross-sectional surface area of the heat insulation of the central core tube, owing to the relatively large wall thickness of the jacket tube of the coaxial ground heat exchanger, and in particular owing to the filling layer that is injected after the installation of the exchanger, for example, a mixture that can include (e.g., consist of) bentonite and cement, between the jacket tube of the exchanger and the surrounding soil. The net cross-sectional surface area for the transport of the heat transfer medium is thus greatly reduced.

SUMMARY

A coaxial ground heat exchanger is disclosed, comprising: a central core tube; and a jacket tube, which delimits an annular gap that extends outward from the core tube, whereby the core tube and the annular gap are configured for a free-flowing heat transfer medium to flow between them, and wherein the jacket tube is formed of a material that, when installed, will directly adjoin a wall of a ground heat exchanger hole.

A method is also disclosed for mounting a coaxial ground heat exchanger in soil, comprising: preparing a ground heat exchanger hole with a drilling device; lowering a coaxial ground heat exchanger into the prepared hole; and after the coaxial ground heat exchanger is introduced to the prepared hole, expanding a first folded hose-like covering, which forms a boundary wall of a jacket tube of the coaxial ground heat exchanger, to essentially adjoin a wall of the ground heat exchanger hole.

A method is also disclosed for operating a coaxial ground heat exchanger having a central core tube, which is provided with a heat-insulating casing, the method comprising: converting a hose-like covering from an originally folded state into a stable expanded state, which covering forms a jacket tube and which, in a mounted state of the coaxial ground heat exchanger directly adjoins a wall of a ground heat exchanger hole; and supplying water as a heat transfer medium to the coaxial ground heat exchanger.

BRIEF DESCRIPTION OF THE DRAWINGS

Additional advantages and features disclosed herein will follow from the subsequent description of exemplary embodiments with reference to the diagrammatic drawings, in depictions that are not to scale, and wherein in the depictions of FIG. 1 to FIG. 5, the same elements or components in each case bear the same reference numbers.

DETAILED DESCRIPTION

A coaxial ground heat exchanger is disclosed, which has a lower pressure drop for the circulating heat transfer medium and allows a higher uptake of heat energy of the surrounding soil in the heat transfer medium. A method for mounting a coaxial ground heat exchanger in the soil is also disclosed, which can be implemented simply and economically and can take into account the specifications of environmental and water protection.

An exemplary coaxial ground heat exchanger is disclosed with a central core tube and a jacket tube, which delimits an annular gap that extends radially outward form the core tube, whereby the core tube and the annular gap are designed for a free-flowing heat transfer medium to flow between them. According to an exemplary embodiment, the jacket tube of the coaxial ground heat exchanger in the installed state of the ground heat exchanger directly adjoins a wall of a ground heat exchanger hole.

An exemplary concept disclosed herein includes modifying a coaxial ground heat exchanger to the extent that in the installed state of the exchanger, a backfilling of the annular gap between the wall of the ground heat exchanger hole and the jacket tube of the coaxial ground heat exchanger can be eliminated. An exemplary coaxial ground heat exchanger is designed in such a way that it directly adjoins the hole wall. As a result, the flow cross-section of the coaxial ground heat exchanger that is available for the transport of the heat transfer medium is considerably enlarged. The heat energy contained in the surrounding soil is transferred directly through the jacket tube of the coaxial ground heat exchanger to the heat transfer medium. Losses because of the material of the backfilling, such as a bentonite-cement mixture, are thus avoided. The jacket tube is pressed by the heat transfer medium circulating in the central core tube and in the annular gap against the wall of the ground heat exchanger hole in order to prevent optionally perforated water layers from being connected to one another hydraulically.

An exemplary variant embodiment calls for the core tube and the annular gap to be designed to be flushed with water as a heat transfer medium. The use of water as a heat transfer medium represents an additional safeguard with respect to environmental and water protection, since it itself cannot cause contamination in the case of leaks. This allows the use of the coaxial ground heat exchanger as disclosed herein even in areas that have long been considered restricted areas for reasons of groundwater protection.

An exemplary variant embodiment disclosed herein calls for the jacket tube of the coaxial ground heat exchanger to be formed by a hose-like covering that can be expanded by elevated internal pressure. The expandability and elasticity of the hose-like covering makes it possible to press the latter ideally against the wall of the ground heat exchanger hole in order to thus achieve as good a contact for the heat energy transfer as possible and, moreover, to seal any perforated water tables in a reliable manner.

In order to facilitate the mounting of the coaxial ground heat exchanger in a ground heat exchanger hole, which, for example, is approximately (e.g., ±15% or so) 450 m and can reach depths of up to 1500 m or greater, another variant embodiment disclosed herein calls for the hose-like covering to surround the core tube in the folded state and to be expandable by a free-flowing medium that is fed with overpressure into a stable end shape after being introduced into the ground heat exchanger hole. The expanded covering in this case in addition performs the function of a "stent," which stabilizes the hole.

In another exemplary variant embodiment disclosed herein, by the hose-like covering having an unfolded diameter, which is larger than the diameter of the hole, for which the ground heat exchanger is provided, it is achieved that the mounted and unfolded or expanded covering, which forms the jacket tube of the coaxial ground heat exchanger, in the completely filled state always also has slight inward folds, which result in an irregular shape. These folds produce an additional stiffening of the hose wall. The volume reduction of the annular gap that occurs at the same time is only slight, however, and in operation has virtually no effect on the flow resistance for the heat transfer medium.

It can also be provided that the hose-like covering of the coaxial ground heat exchanger is permeably delimited at least in places when exceeding a maximum relative overpressure relative to the heat transfer medium, such as relative to water. As a result, this can prevent the covering upon expansion from breaking into crevices or cavities, which can sometimes develop due to larger material bulges when creating the ground heat exchanger hole. Smaller cavities are filled by the water pressed out through the outer jacket. In the case of empty crevices or larger cavities, the overpressure-induced permeability of the covering relative to water in this respect ensures that the latter is expanded only to the extent that it reliably adjoins the hole wall in a sealing manner. In this case, the covering is expanded to an only limited extent in the crevices or cavities; an overexpansion of the material is thus prevented. The material of the covering in this case is designed in such a way that the maximum relative overpressure, which should be achieved, until water goes through the covering, is, for example, approximately 2 bar to 3 bar. The limited permeability of the covering relative to water is in this case suitably limited to those areas that in the mounted state of the ground heat exchanger are located in the solid soil, such as in the rocky subsoil. The area that is closer to the surface, which adjoins the loose soil, is designed in a water-impermeable manner. Since, in the creation of the ground heat exchanger hole, the limits between the loose soil and the rocky subsoil can be determined very precisely, the ground heat exchanger can be matched exactly to the local conditions.

In another exemplary variant embodiment of the coaxial ground heat exchanger, the central core tube and the outer hose-like covering are connected integrally with one another, and they come in the form of endless rolls. For the introduction into the created ground heat exchanger hole, the coaxial ground heat exchanger can be unrolled from a drum in the desired length. At the construction site, only the supplied integral arrangement of the core tube and, for example, folded, covering can be introduced into the ground heat exchanger hole. To this end, the coaxial ground heat exchanger is unrolled easily from a drum in the desired length. Should the length arranged on a drum not be sufficient, any desired additional length of the ground heat exchanger can be unrolled from another drum before or during the insertion into the ground heat exchanger hole and can be connected tightly to the end of the first section at the end points in order to result in the necessary length.

As an alternative, a coaxial ground heat exchanger can also be provided, in which the central core tube and the integrally associated hose-like covering are present in sections cut to length. The sections cut to length can be connected to one another in a fluid-tight manner during introduction into the ground heat exchanger hole. This variant can, for example, be used in particular in the case of less flexible or rigid exchanger tubes.

In another exemplary variant embodiment of the coaxial ground heat exchanger, the central core tube and the expandable hose-like covering are present separated from one another. In this case, the covering is formed by a flat endless roll, which is merged with the latter only during introduction of the central core tube, whereby the longitudinal edges of the hose-like covering are connected to one another in a fluid-tight manner.

The fluid-tight connection of the longitudinal sides of the endless roll forming the hose-like covering is made by, for example, sewing up and/or heat-sealing the adjacent areas in connecting devices specially designed for this purpose.

The hose-like covering that forms the jacket tube of the coaxial ground heat exchanger can, for example, be a plastic composite film, which can have a wall thickness of, for example, approximately 3 mm (or less) up to 15 mm (or greater). For example, a wall thickness of 3 mm can be sufficient at lengths of up to approximately 450 m in order to carry the net weight of the plastic composite film. In the case of larger lengths of the coaxial ground heat exchanger, accordingly a larger wall thickness for the hose-like covering can be selected. The outer covering occupies only a small volume, but in the expanded state, it can have a sufficiently large inherent stability.

An exemplary variant embodiment calls for the covering to have an armoring made of expanded aluminum metal, on which an expandable plastic membrane is applied on both sides. The plastic membrane includes (e.g., consists of), for example, a polyethylene, latex, rubber or similar materials and can be micro-perforated.

In an exemplary variant embodiment, the central core tube is encased with a thermally-insulating casing. The thermally-insulating casing prevents the heated heat transfer medium that rises in the core tube from releasing its heat in part again to the heat transfer medium that flows downward into the annular gap. As a result, the thermal efficiency of the coaxial ground heat exchanger can be increased.

In an exemplary method according to the disclosure for mounting a coaxial ground heat exchanger in the soil, a ground heat exchanger hole is first created with a drilling device. The depth of the hole is, for example, 300 m (or less) to 500 m, and can reach up to 1500 m (or greater). Then, a coaxial ground heat exchanger that is designed as disclosed herein is lowered into the prepared hole. After the coaxial ground heat exchanger is introduced, a first folded hose-like covering, which surrounds a core tube provided with insulation and at the same time forms the boundary wall of a jacket tube of the coaxial ground heat exchanger, is expanded in such a way that it essentially adjoins the hole wall.

In an exemplary method according to the disclosure, the coaxial ground heat exchanger is mounted in the ground heat exchanger hole in such a way that the hose-like outer covering, which at the same time forms the boundary wall of the jacket tube of the coaxial ground heat exchanger, directly adjoins the hole wall. As a result, an annular gap between the boundary wall of the jacket tube and the hole wall is avoided, which can be backfilled in known ground heat exchangers. Thus, in the method according to the disclosure, the injection step for the filler, such as a mixture that includes (e.g., consists) of bentonite and cement, is not necessary. The direct contact between the boundary wall of the jacket tube formed by the expanded covering with the hole wall promotes the transfer of heat energy from the soil to the heat transfer medium that circulates in the coaxial ground heat exchanger, which heat transfer medium is, for example, formed by water in this embodiment.

By the elimination of the backfilling layer, the flow cross-section that is available for the circulating heat transfer medium is significantly enlarged relative to known ground heat exchangers. As a result, a slighter pressure drop arises over the length of the coaxial ground heat exchanger, which can have a direct advantageous effect on the energy costs for the recycling of the heat transfer medium.

To introduce the coaxial ground heat exchanger into the ground heat exchanger hole, the folded outer covering can be encased by a very thin film. The thin film can be designed in such a way that it cracks at a relatively low overpressure and then makes it possible for the first folded covering to unfold.

In an exemplary variant of the method according to the disclosure, the expansion of the folded hose-like covering of the coaxial ground heat exchanger is carried out with compressed air. In this case, the folded covering is inflated to its full diameter by compressed air, which, for example, is fed with overpressure by the central core tube of the coaxial ground heat exchanger. On the front end of the central core tube, an adjustable heat source, such as an infrared radiator, is arranged. The central core tube is drawn at an adjustable speed from the borehole base up to the surface in order to heat the expanded hose-like covering for short periods of time in zones. Plastic deformation develops because of the overpressure and the lower strength of the covering material in the heated zone. In this case, the covering material is pressed into the small cavities of the hole wall. Because of the thermal contact with the colder soil, the covering material drops below its critical flow temperature and retains its shape. Then, the core tube is lowered again into its original position.

In order to prevent the expanded covering from resulting in an overexpansion in the area of larger cavities in the hole wall, an exemplary variant calls for sensors for the measurement of the expansion or bulging in zones to be arranged in the hose-like covering. When a boundary value is reached, the travel speed of the heat source is increased; i.e., the heat source moves faster in the direction of the surface in order to limit the plastic deformation as a result. The sensors arranged in the covering thus make possible an adjustment of the plastic deformation of the covering. As a result, damage to the covering by excessive bulging can be avoided.

An alternative exemplary method for mounting a coaxial ground heat exchanger in the soil calls for the expansion of the folded hose-like covering of the coaxial ground heat exchanger to be carried out with water, which is filled from above in the annular gap between the central core tube and the folded covering. This method is suitable, for example, will coaxial ground heat exchangers, in which water is used as a heat transfer medium. In this case, the water, which is first used for expansion or unfolding of the hose-like covering, can then also be used as a heat transfer medium. The expansion of the hose-like covering is carried out from the borehole base upward in the direction of the surface. The pressure in the lower areas of the hole is greater than toward the top. By the unfolding and the increase in volume of the hose-like covering, water, which in most cases is located between the covering and the hole wall, is pressed in the direction of the surface. In the area of the larger cavities, the covering further expands and partially penetrates into the cavities. Since the covering material starting from a relative overpressure of, for example, 2 bar to 3 bar is partially permeable to the water that is fed, water can exit from the interior of the coaxial ground heat exchanger into the cavity. As a result, an excessive expansion of the covering material is avoided.

An exemplary variant of the method of the expansion with water calls for the pressure on the water column in the central core tube to be increased continuously or in stages up to an overpressure of, for example, approximately 12 bar to approximately 15 bar after the central core tube is completely filled up to the surface and after a waiting period. The waiting period can last from several minutes up to two days. The waiting period is desirable so that smaller cavities in the hole wall can be completely filled with water, which exits through the permeable jacket, and the air that is contained in the cavities can be expelled. Larger cavities or empty crevices cannot, of course, be completely filled with water. Here, it is sufficient for the covering to bulge into the cavities or crevices to a limited extent. The overpressure is maintained for a while in order to expand the covering to the desired extent. The length of time can, for example, be 30 seconds up to 1½ hours (or lesser or greater). Because of the subsequent increase in pressure on the water column in the central core tube, the hose-like covering is pressed still tighter against the hole wall. The folds are smoothed or partially compressed. As a result, the covering material is elongated at these spots (i.e., plastically deforms) without becoming leaky. The incompressible water in the cavities and the permeability of the covering prevent too strong a deformation of the covering. If the pressure of the water in the cavities is too large because of a pressing of the covering material, water can flow through the permeable covering material into the annular space between the central core tube and the hose-like covering in order to offset the pressure again.

A coaxial ground heat exchanger that is designed according to the disclosure with a central core tube, which is provided with a heat-insulating casing, and a hose-like covering that is converted from an originally folded state into a stable expanded state, which at the same time forms the jacket tube of the coaxial ground heat exchanger and in the mounted state of the coaxial ground heat exchanger adjoins a wall of a ground heat exchanger hole, is, for example, suitable for operation with water as a heat transfer medium. Water as a heat transfer medium has the advantage that it also can result in no contamination in the event of a deliberate or accidental exiting of the heat transfer medium from the coaxial ground heat exchanger. As a result, the coaxial ground heat exchanger according to the disclosure is also suitable for use in areas that have long been considered restricted areas for reasons of groundwater protection.

Figure 1:
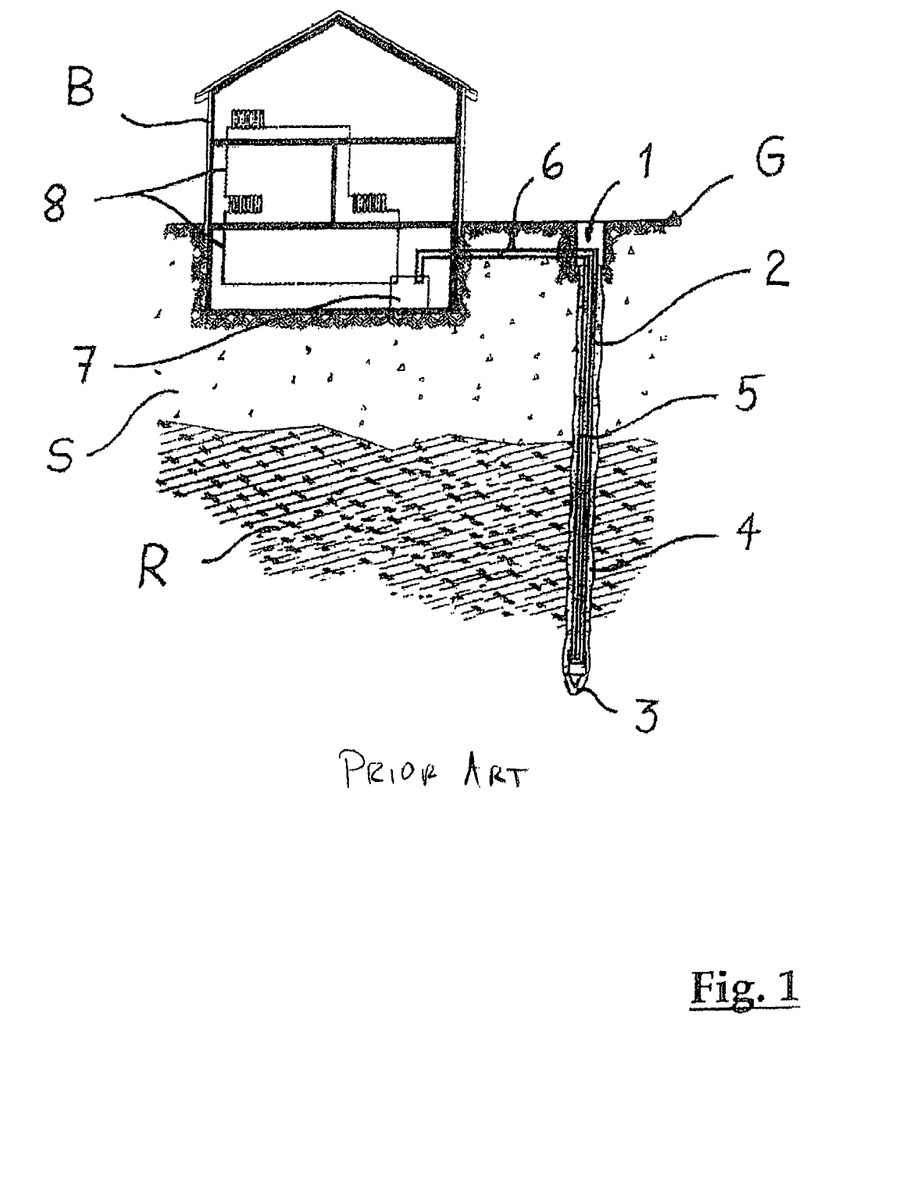
FIG. 1 shows a known principle of a warm-water preparation with a ground heat exchanger.

The diagrammatic sectional view in FIG. 1 shows the principle of known ground heat exchanger technology in the example of heating a building B. To this end, a ground heat exchanger 5, which is used in a ground heat exchanger hole 1 of approximately 50-350 m, is connected via a feed 6 to a heat pump 7. The heat pump 7 supplies a heating system 8 of the building B with the desired amount of warm water. The ground heat exchanger 5 used in the hole 1 is a heat exchanger, in which a fluid circulates. According to the depicted embodiment, the ground heat exchanger 5 has four exchanger tubes made of polyethylene, which are assembled in pairs in each case to form a U-tube and are connected with the feed 6 to the heat pump 7. The exchanger tubes have, for example, diameters of 32 mm or 40 mm. The ground heat exchanger 5 is pushed to the base 3 of the hole. The hollow space that remains between the ground heat exchanger 5 and the hole wall 2 is backfilled in a compact manner with a filler 4, which can include a mixture of bentonite and cement, in order to ensure good thermal contact between the exchanger tubes of the ground heat exchanger 5 and the hole wall 2. As filler 4, other materials that ensure a sufficiently good heat transfer are also suitable. For example, a method variant is also known, in which water is used as filler. The fluid circulating in the exchanger tubes, in most cases water with a proportion of 15-35% antifreeze, extracts ground heat from the subsoil G and supplies the heat pump 7 with this geothermal energy. With the heat pump 7, the temperature is then raised to the level that is desired for heating purposes. FIG. 1 further indicates that the subsoil G in most cases includes of softer soil S that is closer to the surface and hard rocky strata R. The ground heat exchanger hole 1 is driven into the hard rocky strata R since it is there that the most stable temperature conditions, dependent only upon the depth of the hole, are encountered.

Figure 2:
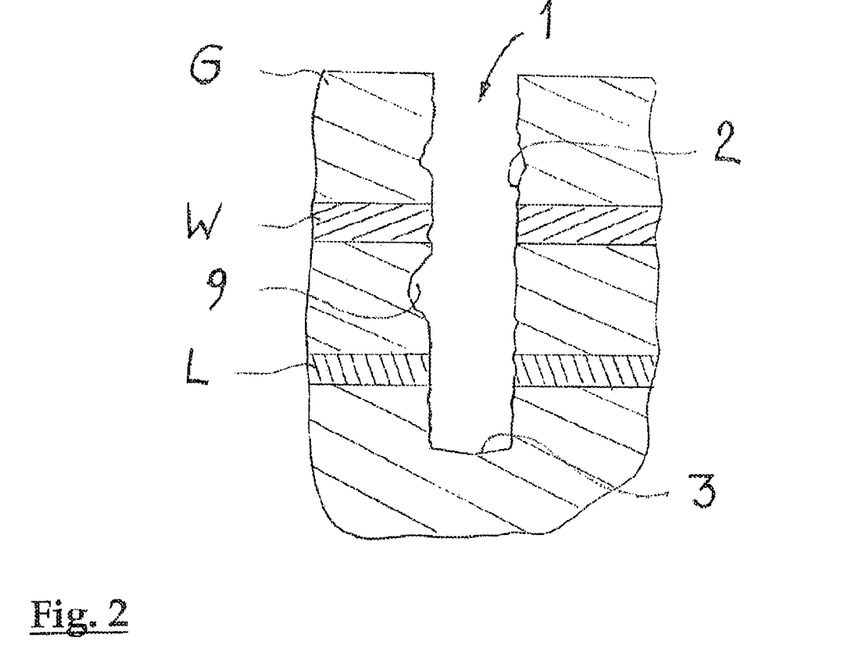
FIG. 2 shows a hole for an exemplary ground heat exchanger.

FIG. 2 diagrammatically shows an axial section of a ground heat exchanger hole 1. The hole wall in turn bears the reference number 2. The borehole base is provided with the reference number 3. The diameter of the ground heat exchanger hole 1 is, for example, approximately 7.62 cm to 15.24 cm (3-6 inches). The subsoil is in turn referred to with G. If the subsoil is compact, homogeneous and dry, then a thermally-insulated central tube could easily be lowered into the ground heat exchanger hole 1. The wall of the central tube and the rock delimit an annular gap, which could be filled with a heat transfer medium, which could be transported in the heated state by the insulated central tube to the surface in order to release there the absorbed heat energy via a heat exchanger to a heat pump. The cooler heat transfer medium is then transported again in the direction of the borehole base 3. In reality, a ground heat exchanger hole results, but not by compact rocks; rather, various strata of loose and more or less solid soil are passed through, which also contain, for example, different water tables L, W, which should not be intermixed over the long term. For example, the water table W can contain contaminated water, while the water table L contains clean groundwater, which serves as a drinking water reserve. The hole wall 2 often has bulges and cavities 9, which can be further enlarged by water leachates. In the mounting of a ground heat exchanger, it should therefore be taken into account that different water tables can be reliably separated from one another, and bulges and cavities 9 can be stabilized so that they cannot be further enlarged.

Figure 3:
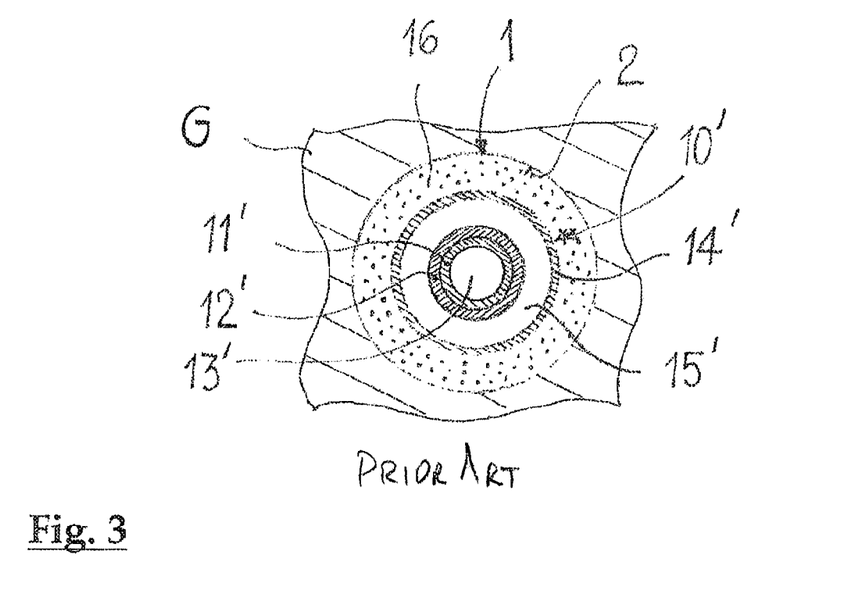
FIG. 3 shows a cross-section of an exemplary known coaxial ground heat exchanger, arranged in a hole, with a thermally-insulated central core tube and a jacket tube.

In addition to the ground heat exchangers indicated in FIG. 1 with pairs of U-tubes, coaxial ground heat exchangers are also known. The cross-sectional depiction in FIG. 3 shows a diagrammatic cross-section of the coaxial ground heat exchanger 10' mounted in a ground heat exchanger hole 1 in the subsoil G. It has a central core tube 11', which is provided with a thermal insulation 12'. The thermally-insulated central core tube 11' is surrounded by a jacket tube 14'. The wall of the jacket tube 14' delimits an annular gap 15', which extends between the outside wall of the insulation 12' and the wall of the jacket tube 14'. An annular gap that remains between the hole wall 2 and the outside wall of the jacket tube 14' is filled with a filler 16, usually a mixture of bentonite and cement. The filler has the object of stabilizing the hole wall 2 to separate different water tables from one another in a reliable manner, and it is to provide for the best possible transport of the heat energy that is present underground to the heat transfer medium that circulates in the coaxial ground heat exchanger 10'. From the diagrammatic depiction, it is immediately evident that the flow cross-section that is available for the heat transfer medium is relatively small compared to the actual cross-section of the ground heat exchanger hole, since the filler occupies up to one third of the borehole cross-section. During operation of the known coaxial ground heat exchanger 10', this results in an increased pressure drop over the length of the exchanger and to a relatively high energy expense resulting therefrom for the circulation of the heat transfer medium. The expense for the mounting of this coaxial ground heat exchanger 10' of the state of the art is relatively high, not least because of the necessary injection step for the filler 16.

Figure 4:
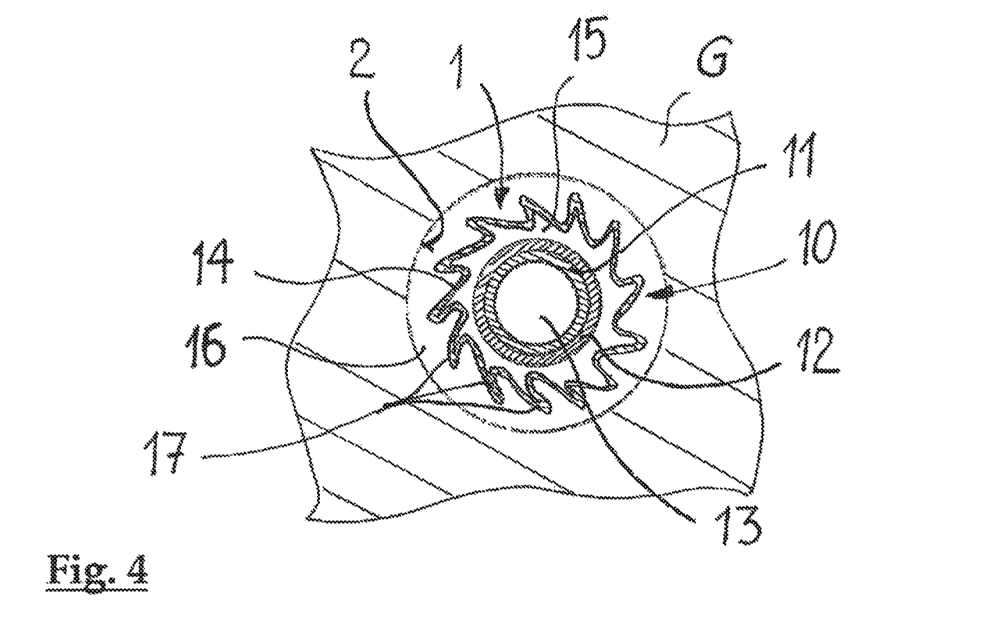
FIG. 4 shows a cross-section of an exemplary coaxial ground heat exchanger according to the present disclosure that is arranged in a ground heat exchanger hole with a thermally-insulated central core tube and an expandable hose-like covering.

FIG. 4 shows a diagrammatic cross-sectional depiction, analogous to FIG. 3, of an exemplary coaxial ground heat exchanger according to the disclosure. The same components are provided in each case with the same reference numbers as in FIG. 3, but without the apostrophe "'."

A coaxial ground heat exchanger according to the disclosure, which is provided overall with the reference number 10, is lowered into a ground heat exchanger hole 1. The coaxial ground heat exchanger 10 has a central core tube 11, which is encased with a thermal insulation 12. Reference number 14 refers to an expandable hose-like covering, which is shown in FIG. 4 in the folded state. The folds are provided with the reference number 17. In the expanded state, the hose-like covering 14 directly adjoins the wall 2 of the ground heat exchanger hole 1. A gap 16 that exists before the unfolding between the covering 14 and the hole wall 2 disappears during the expansion of the covering 14, which forms the jacket tube of the coaxial ground heat exchanger 10, which now directly adjoins the hole wall 2. A backfilling of the gap 16 with a filler is not necessary. After the filler is eliminated, a considerably larger cross-sectional surface area than in the case of the coaxial ground heat exchanger of the state of the art remains for a heat transfer medium that flows through the coaxial ground heat exchanger 10. As a result, a core tube 11 can be used, whose free cross-section 13 has a larger proportion of the cross-sectional surface area of the ground heat exchanger hole 1. In the expanded state of the hose-like covering 14, the annular gap 15 between the thermal insulation and the covering 14 naturally also has a larger cross-sectional surface area than in the case of known coaxial ground heat exchangers.

The hose-like covering 14 that forms the jacket tube of the coaxial ground heat exchanger 10 is, for example, a plastic composite film and has, depending on the length of the coaxial ground heat exchanger, an exemplary wall thickness of approximately 3 mm to 15 mm. For example, a wall thickness of 3 mm is sufficient at lengths of up to approximately 450 m to bear the net weight of the plastic composite film. In the case of larger lengths of the coaxial ground heat exchanger, a larger wall thickness for the hose-like covering can be accordingly selected. The outer covering occupies only a small volume, but in the expanded state has a sufficiently large inherent stability. The small wall thickness of the plastic composite film also promotes the heat transfer from the subsoil G into the heat transfer medium that circulates in the coaxial ground heat exchanger 10.

An exemplary variant embodiment calls for the covering 14 to have an armoring made of expanded aluminum metal, to which an expandable plastic membrane is applied on both sides. The plastic membrane includes (e.g., consists of), for example, polyethylene, latex, rubber or similar materials and is, for example, micro-perforated. The expanded metal can be deformed to the desired extent by internal pressure, and the covering 14 loses the required stability. Another exemplary variant embodiment can provide that the outer covering is connected to the central core tube via deployable fins or arms arranged on the central core tube. The fins or arms are arranged distributed over the periphery of the central core tube and its length. They can be unfolded by an elevated internal pressure and in the unfolded state occupy a stable end position. In addition, they are to radially support the outer covering and prevent a collapsing.

Figure 5:
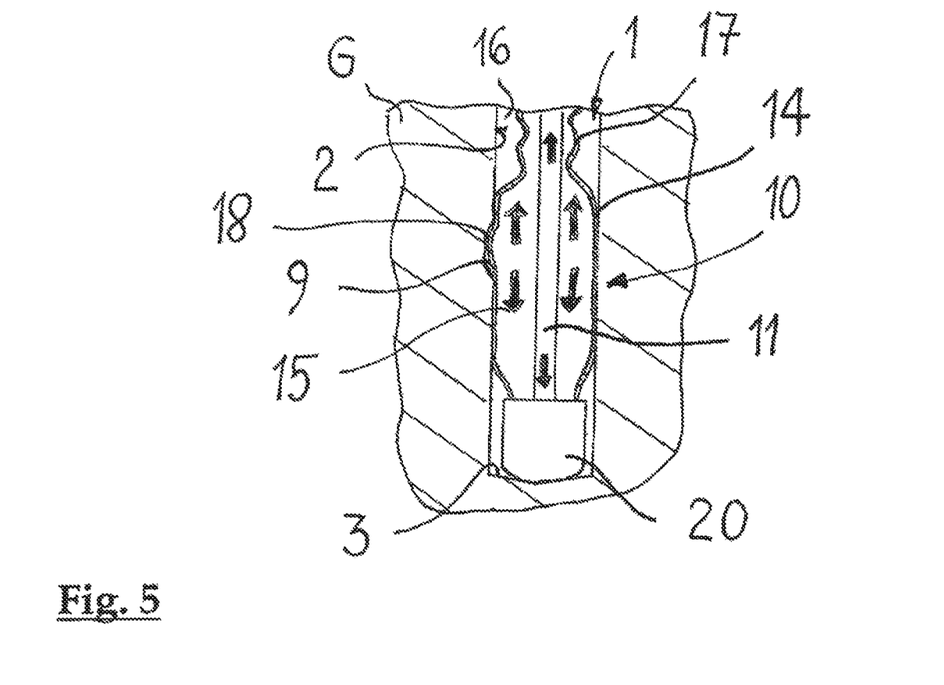
FIG. 5 shows a diagrammatic depiction of an exemplary coaxial ground heat exchanger as disclosed herein, lowered into the hole, with a partially expanded hose-like covering for explaining an exemplary mounting method.

FIG. 5 shows a section of a ground heat exchanger hole 1 that is close to the borehole base with an inserted coaxial ground heat exchanger 10 that is designed according to the disclosure and that is used for explaining the mounting method of the exchanger in the hole 1. After the ground heat exchanger hole is created, which hole can have, for example, a depth of approximately 450 m and up to 1,500 m, the coaxial ground heat exchanger 10 according to the disclosure is introduced and pushed to the base 3 of the hole 1. The coaxial ground heat exchanger 10 has an exchanger head 20 on its end facing the borehole base 3, which head is connected to the thermally-insulated central core tube 11 and to the expandable hose-like covering 14, which is present in the folded state during the lowering of the coaxial ground heat exchanger 10. In the exchanger head 20, flow channels (not shown) are provided, which connect the central core tube and the annular gap between the central core tube 11 and the covering. As already mentioned at other points, the coaxial ground heat exchanger 10 can come in the form of endless rolls, or can be prepared in sections that are cut to length and that are connected to one another in a fluid-tight manner with introduction into the ground heat exchanger hole.

The thermally-insulated central core tube 11 and the expandable hose-like covering 14 can also be present separated from one another. In this case, the covering is formed by a flat endless roll, which is merged with the latter when introducing the central core tube, whereby the longitudinal edges of the hose-like covering are connected in a fluid-tight manner to one another. The exchanger head 20 facilitates the introduction of the coaxial ground heat exchanger 10 by pulling the latter downward owing to its weight and providing for a stretched-out position of the central core tube 11.

In a first exemplary variant of the mounting method for the coaxial ground heat exchanger, after the exchanger head 20 has reached the base of the ground heat exchanger hole 1, the annular gap between the thermally-insulated central core tube 11 and the folded covering 14 slowly fills with water from the top. In this case, the folded covering 14 expands from the bottom and is pressed tightly against the hole wall 2. Because of the volume enlargement of the hose-like covering 14, water, which is located in the intermediate space 16 between the covering 14 and the hole wall 2, slowly presses upward. If the hole wall 2 has, for example, a cavity 9, the hose-like covering 14 partially penetrates the latter in order to fill it at least partially with a bulging 18. In order to avoid an overexpansion or even a break in the covering 14 in the case of larger cavities 9 and crevices, the hose-like covering 14 is permeably delimited for water at least in places starting from a relative pressure difference of, for example, approximately 2 bar to 3 bar. As soon as this overpressure is present at the covering 14, the water exits through the covering 14 into the cavity 9. Smaller cavities are filled up with water in this way. As a result, a further bulging of the covering 14 is avoided. In the case of larger cavities or crevices, only a limited bulging of the covering 14 is carried out in the cavity or crevice, by which the latter are reliably sealed on the edges. The covering can be suitably designed in such a way that it is designed in a water-impermeable manner in the areas that are near to the surface and that can adjoin loose soil in the expanded state.

The expanded outside diameter of the covering 14 is selected somewhat larger than the diameter of the ground heat exchanger hole 1; for example, the diameter difference is, for example, approximately 3% to 10%. As a result, the hose-like covering 14 after it is completely filled with water always has folds that are still small and point inward and that are arranged in an irregular manner. These folds can ensure an additional stiffening of the covering 14. After the central core tube 11 is also completely filled with water, and after a waiting period of, for example, approximately 5 minutes to 48 hours, the pressure on the water column in the core tube 11 is continuously increased up to an overpressure of, for example, approximately 12 bar to 15 bar and maintained for a time span of approximately, for example, 30 seconds up to 1½ hours. The waiting period is desirable so that any smaller cavities 9 found in the hole wall 2 are filled completely with water from the interior of the covering 14 and air contained in the cavities can be expelled. In the case of larger cavities or crevices, it results only in a limited expansion of the covering into the cavity or crevice.

Because of the pressure increase in the water column in the core tube 11, the covering 14 is pressed more strongly on the hole wall 2. The folds that are still present are partially smoothed, partially compressed. The covering material is elongated (i.e., plastically deformed) at these spots, without breaking. As a result, the inherent stiffness of the expanded covering 14 forming the jacket tube of the coaxial ground heat exchanger 10 is increased. The incompressible water in the cavities 9 between the covering 14 and the hole wall 2 prevents an overexpansion and leakage of the covering 14 at these spots. If the pressure of the water located there rises too greatly because of the pressing of the covering 14 into the cavities 9, this water can flow from the cavities 9 through the covering 14 into the annular gap 15. The strong pressing of the covering 14 on the edges of the cavities 9 results in a reliable sealing and prevents a vertical circulation of groundwater from various aquifers. The covering 14 that is pressed against the hole wall 2 stabilizes the hole wall 2 and prevents a further bulging of material. The covering that directly adjoins the hole wall 2 and the still present folds promote the transition of heat energy from the subsoil G into the heat transfer medium. After the coaxial ground heat exchanger 10 has been mounted in the hole in the above-described way, it can be connected and operated with the heat exchanger of the heat pump. The poured-in water serves as heat transfer medium in the coaxial ground heat exchanger 10. A pressure vessel that is connected in-between (not shown) ensures that in the coaxial ground heat exchanger, an overpressure of approximately 2-3 bar can be always maintained.

In an exemplary method variant for mounting a coaxial ground heat exchanger 10 that is designed according to the disclosure, the first folded hose-like covering 14 is expanded with compressed air instead of with water. The folded-in hose-like covering 14 is inflated by overpressure to its full diameter. In this respect, the compressed air is fed, for example, through the central core tube 11. At the front end of the core tube, a heat source, for example an infrared radiator, is attached. The latter is pulled slowly onto the surface together with the core tube 11 from the borehole base. Because of the slowly raised heat source, the covering 14 that is expanded by overpressure is heated in zones. Because of the overpressure and the strength of the covering material that is reduced by the heating, plastic deformation takes place. The covering material is thus pressed tightly against the hole wall 2 and penetrates into the small pores and scores. Because of the thermal contact with the colder subsoil, the covering material quickly drops below its critical flow temperature again. The heat source that is attached on the front end of the core tube is pulled upward at a controlled speed. In order to avoid excessive expansion of the covering material in the area of the larger cavities 9, sensors that monitor the extent of the expansion of the covering can be arranged in the covering. If a boundary value of the expansion of the covering 14 is reached, the heat source is thus pulled up faster. As a result, the plastic deformation of the zone in question is limited. In addition, larger cavities 9 and crevices are in many cases filled with water. Water is incompressible and thus automatically prevents excessive bulging of the covering 14. After the widening and deformation of the covering is completed, the core tube is again pushed to the exchanger head remaining on the borehole base. If the coaxial ground heat exchanger 10 has been mounted in the hole 1 in this way, it can be filled with the heat transfer medium, suitably water, and connected to the heat exchanger and the heat pump. A pressure vessel can also be connected in-between so that in the coaxial ground heat exchanger, an overpressure of, for example, approximately 2-3 bar can be always maintained.

In order to facilitate the introduction of the coaxial ground heat exchanger into the ground heat exchanger hole still further, the folded outer covering can be encased by a very thin film. The thin film is designed in such a way that it cracks at a relatively low overpressure and then makes it possible for the first folded covering to unfold.

Variant embodiments of the coaxial ground heat exchanger described in more detail above and the cited method variants in their mounting in a ground heat exchanger hole serve to explain features disclosed herein. The general ideas disclosed herein are in no way to be limited thereby, however, nor are equivalent embodiments to be ruled out.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A coaxial ground heat exchanger mounted within a ground heat exchanger hole, comprising:
   a central core tube; and
   an expandable jacket tube which encloses said central core tube, wherein an inner wall of said expandable jacket tube and an outer wall of said central core tube delimit an annular gap, the annular gap extending along a central axis of said coaxial ground heat exchanger and being adapted to accommodate a heat transfer medium, wherein the heat transfer medium circulates from the annular gap through a length of the central core tube or vice versa,
   wherein the expandable jacket tube is formed by an expandable hose covering that will expand radially in response to an elevated internal pressure in said annular gap, the expandable hose covering encasing the central core tube in a folded state, the expandable hose covering arranged to be brought into a stable end shape by the heat transfer medium when the heat transfer medium is fed into said annular gap with overpressure, wherein the expandable hose covering in the stable end shape encloses said central core tube along an entire circumference of the expandable hose covering, and an outer wall of said expandable hose covering adjoins an inner wall of the ground heat exchanger hole along an entire internal circumference of the ground heat exchanger hole in said stable end shape, and wherein the expandable hose covering comprises an unfolded diameter that is selected to be larger than a diameter of the ground heat exchanger hole.

2. The coaxial ground heat exchanger according to claim 1, wherein the core tube and the annular gap are configured to be flushed with water as a heat transfer medium.

3. The coaxial ground heat exchanger according to claim 1, wherein an area of the hose covering that is closer to a surface of the ground heat exchanger hole and that adjoins loose soil in a mounted state is configured in a water-impermeable manner.

4. The coaxial ground heat exchanger according to claim 1, wherein the expandable hose covering is formed by a plastic composite film, which has a wall thickness of 3 mm to 15 mm.

5. The coaxial ground heat exchanger according to claim 1, wherein the central core tube comprises a thermally-insulating casing.

* * * * *